(12) United States Patent
Bush et al.

(10) Patent No.: US 7,525,873 B1
(45) Date of Patent: Apr. 28, 2009

(54) SEISMIC INVERSION OF CONDITIONED AMPLITUDE SPECTRA

(75) Inventors: Michael D. Bush, Gerrards Cross (GB);
Paul G. A. Garossino, Katy, TX (US);
Paul R. Gutowski, Seattle, WA (US);
Gregory A. Partyka, Katy, TX (US)

(73) Assignee: BF Corporation North America Inc., Warrenville, IL (US)

( * ) Notice: Subject to any disclaimer, the term of this patent is extended or adjusted under 35 U.S.C. 154(b) by 218 days.

(21) Appl. No.: 11/187,728

(22) Filed: Jul. 22, 2005

Related U.S. Application Data

(60) Provisional application No. 60/590,742, filed on Jul. 23, 2004.

(51) Int. Cl.
*G01V 1/30* (2006.01)
*G01V 1/32* (2006.01)

(52) U.S. Cl. .............................. 367/47; 367/37; 367/49; 367/73

(58) Field of Classification Search ................... 367/24, 367/37–39, 46, 47, 49, 73; 702/16, 17
See application file for complete search history.

(56) References Cited

U.S. PATENT DOCUMENTS

| | | | |
|---|---|---|---|
| 3,274,542 A * | 9/1966 | Ruehle ........................ | 367/46 |
| 4,188,610 A * | 2/1980 | Nelson ........................ | 367/14 |
| 4,312,050 A | 1/1982 | Lucas | |
| 4,339,810 A * | 7/1982 | Nichols et al. ................. | 367/49 |
| 4,679,174 A * | 7/1987 | Gelfand ........................ | 367/73 |
| 4,742,497 A | 5/1988 | Beasley et al. | |
| 4,780,859 A * | 10/1988 | Hadidi et al. .................. | 367/43 |
| 4,797,861 A | 1/1989 | Beasley | |
| 4,817,062 A * | 3/1989 | De Buyl et al. ................ | 367/73 |
| 4,964,086 A | 10/1990 | O'Connell et al. | |
| 5,136,552 A | 8/1992 | Kelly et al. | |
| 5,274,605 A | 12/1993 | Hill | |
| 5,349,527 A | 9/1994 | Piepzrak et al. | |
| 5,414,674 A | 5/1995 | Lichman | |
| 5,500,832 A | 3/1996 | Berryhill | |
| 5,850,622 A * | 12/1998 | Vassiliou et al. .............. | 367/46 |
| 5,870,691 A | 2/1999 | Partyka et al. | |
| 5,940,778 A | 8/1999 | Marfurt et al. | |
| 6,016,462 A | 1/2000 | Schneider et al. | |
| 6,021,092 A * | 2/2000 | Paffenholz et al. ............ | 367/24 |
| 6,131,071 A | 10/2000 | Partyka et al. | |

(Continued)

OTHER PUBLICATIONS

Rader, et al:, Shallow detection in the near surface, a coherence cube processing application; *The Leading Edge*, Jul. 2002, pp. 672-674.

(Continued)

*Primary Examiner*—Jack W. Keith
*Assistant Examiner*—Scott A Hughes
(74) *Attorney, Agent, or Firm*—Terry L. Watt; James A. Gabala

(57) ABSTRACT

According to a preferred aspect of the instant invention, there is provided herein a system and method for using both a temporal zone of seismic data and conditioned amplitude spectra thereof to determine the underlying layer sequence. The instant invention is suitable both for determining layer positions and layer impedance magnitudes, that best describes the geologic sequence sampled by a band limited seismic source wavelet as reflected from the zone.

2 Claims, 6 Drawing Sheets

U.S. PATENT DOCUMENTS

| | | | |
|---|---|---|---|
| 6,430,508 B1 * | 8/2002 | Sudhakar et al. | 702/6 |
| 6,487,502 B1 | 11/2002 | Taner | |
| 6,594,585 B1 | 7/2003 | Gersztenkorn | |
| 6,965,830 B1 * | 11/2005 | Bahorich | 702/14 |
| 6,985,838 B1 * | 1/2006 | Jarchow | 703/5 |
| 2004/0044479 A1 | 3/2004 | Sasone | |

OTHER PUBLICATIONS

Partyka, et al. Interpretational applications of spectral decomposition in reservoir characterization; *The Leading Edge*, Mar. 1999, pp. 353-360.

Chopra, et al., Integrating coherence cube imaging and seismic inversion; *The Leading Edge*, Apr. 2001; pp. 354-362.

Marfurt, et al., Narrow-band spectral analysis and thin-bed tuning; *Geophysics*, vol. 66, No. 4 (Jul.-Aug. 2001), pp. 1274-1283.

Mukerji, et al., Mapping lithofacies and pore-fluid probabilities in a North Sea reservoir: Seismic inversions and statistical rock physics, *Geophysics*, vol. 66, No. 4 (Jul.-Aug. 2001) pp. 988-1007.

Okaya, D.A., Spectral properties of the earth's contribution to seismic resolution, *Geophysics*, vol. 60, No. 1 (Jan.-Feb. 1995), p. 241-251, 9 Figs. XP-002057049.

Marangakis, et al., Use of integrated energy spectra for thin-layer recognition, *Geophysics*, vol. 50, No. 3 (Mar. 1985), p. 495-500.

Widess, How Thin is a Thin Bed?, *Geophysics*, , vol. 38, p. 1176-1180.

Neidell & Poggiagliomi, Strategraphic Modeling and Interpretation—Geophysical Principles and Techniques, in Seismic Stratigraphy Applications to Hydrocarbon Exploration, A.A.P.G. Memoir 26, 1977.

Seismic Data Processing, Society of Exploration Geophysicists, 1987, Chapters 2.2, and 2.2.1.

Dalley, R.M. et al., Dip and Azimuth Displays for 3D Seismic Interpretation, *First Break*, vol. 7, No. 3, Mar. 1989, pp. 86-95.

Hesthammer, Jonny, Evaluation of the timedip, correlation and coherence maps for structural interpretation of seismic data. *First Break*, 16.5, 1998 pp. 151-165.

Marfurt, K. J., et al., 3-D seismic attributes using a semblance-basec coherency algorithm, *Geophysics*,, vol. 63, No. 4, Jul.-Aug. 1998, pp. 1150-1165.

Robertson, James D., et al., Complex seismic trace analysis of thin beds:, *Geophysics*, vol. 49, No. 4, Apr. 1984, pp. 344-352.

Taner, M.T., et al., Complex seismic trace analysis, *Geophysics*, vol. 44, No. 6, Jun. 1979. pp. 1041-1063.

\* cited by examiner

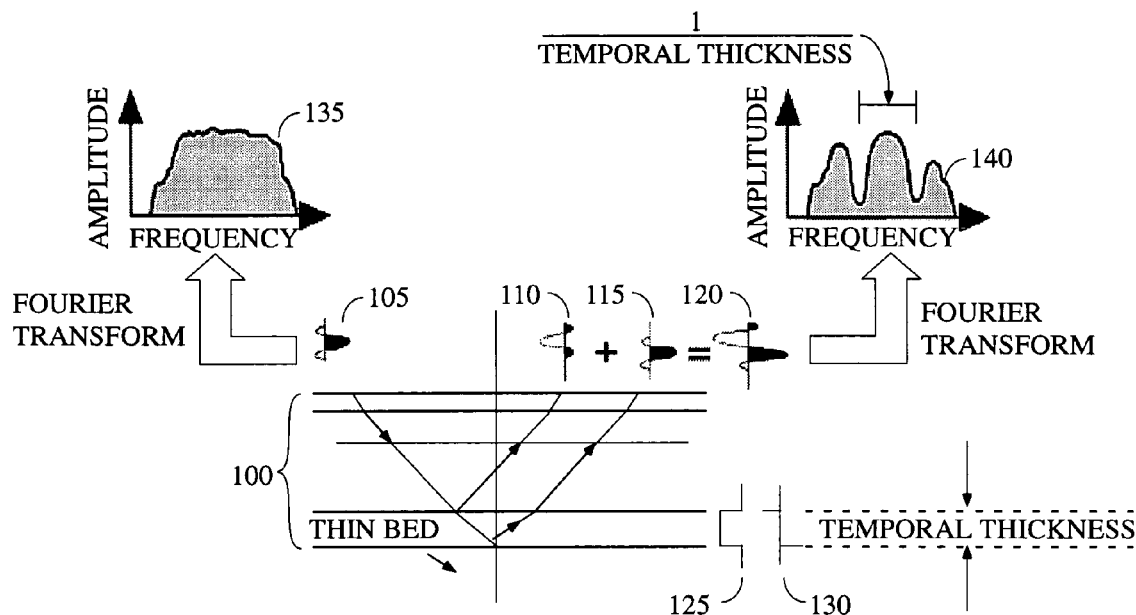
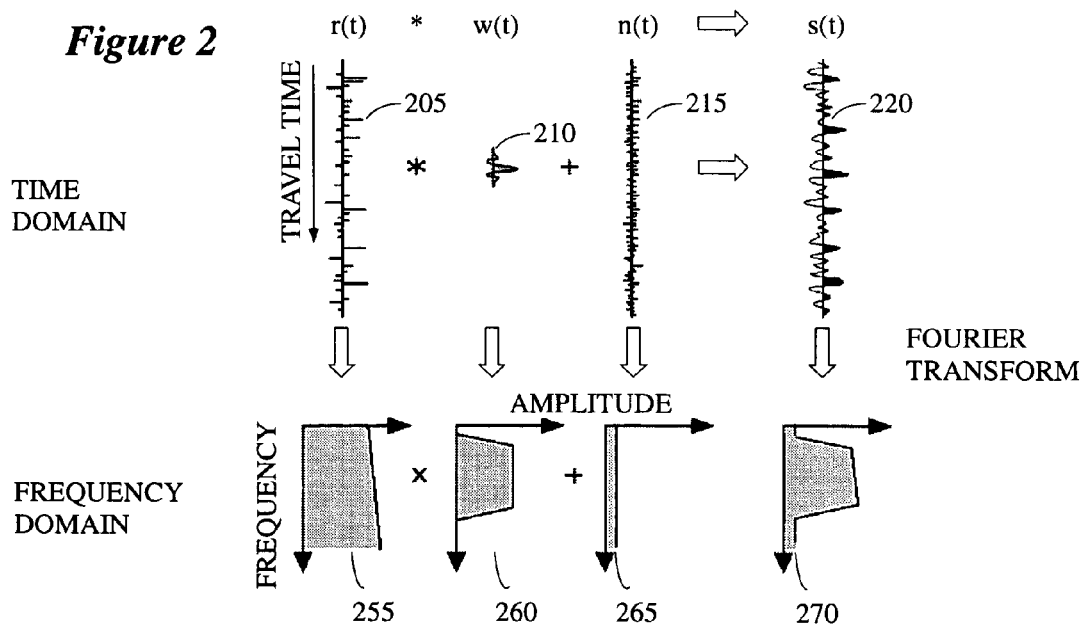

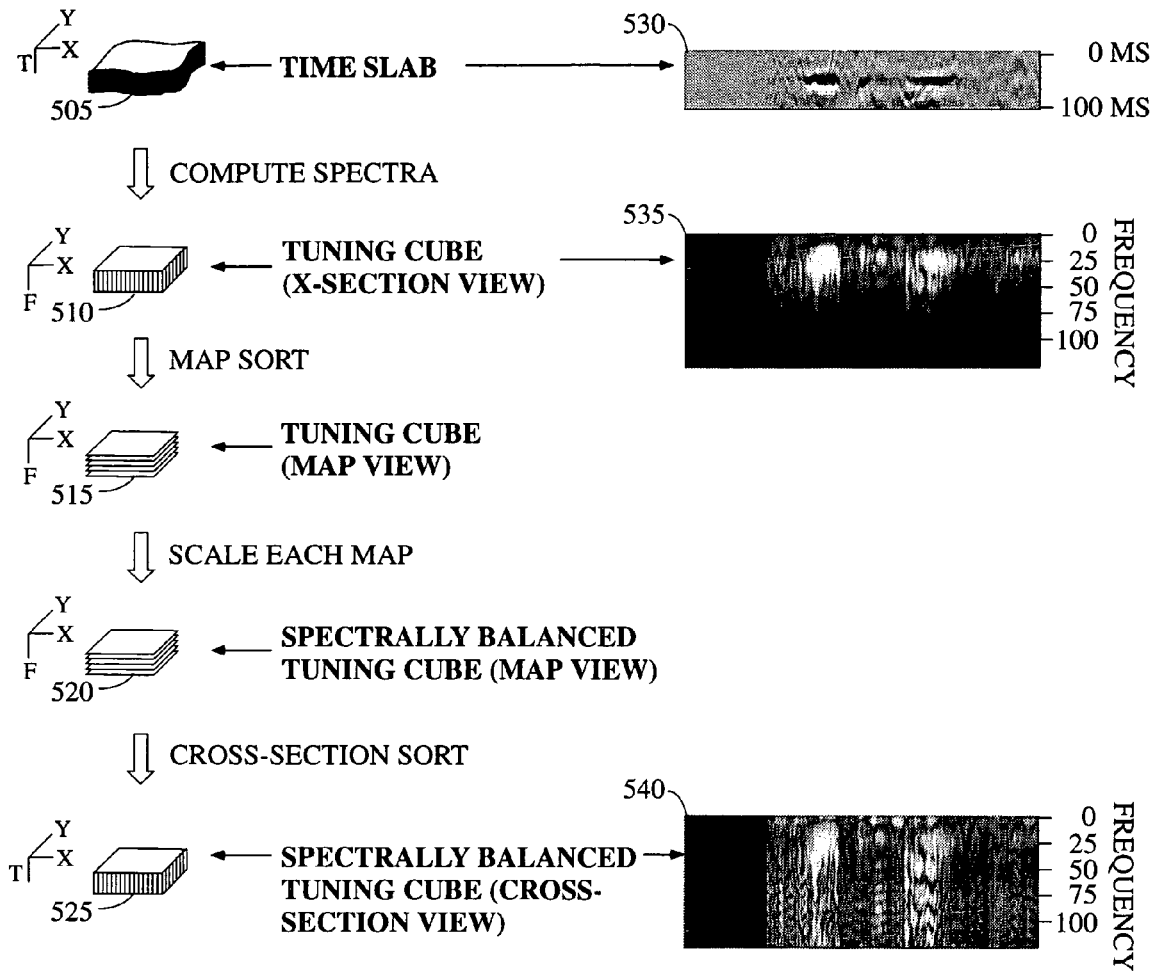
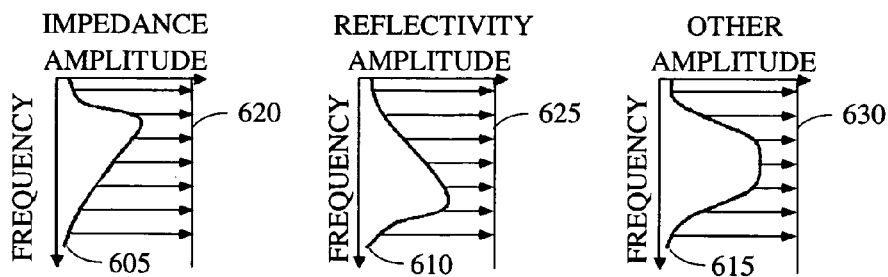
SHAPES OF SPATIALLY DERIVED FREQUENCY-BY-FREQUENCY
MEDIAN AMPLITUDES BEFORE AND AFTER SPECTRAL BALANCING

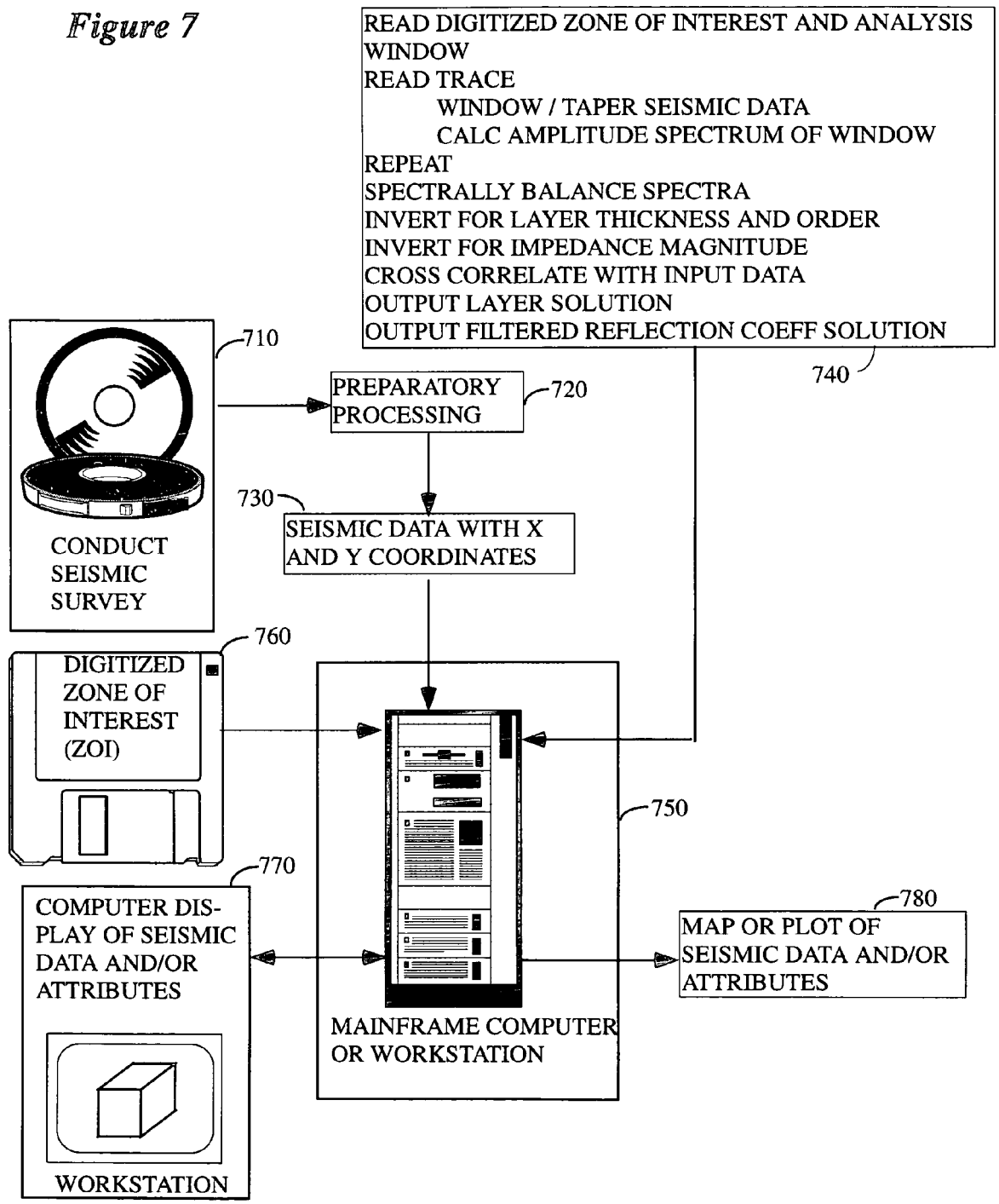

SEISMIC INVERSION OF CONDITIONED AMPLITUDE SPECTRA

RELATED CASE

This application claims the benefit of U.S. Provisional Patent Application Ser. No. 60/590,742 filed on Jul. 23, 2004 and incorporates said provisional application by reference into this disclosure as if fully set out at this point.

TECHNICAL FIELD

This invention relates to the general subject of seismic exploration and, in particular, to methods for quantifying and visualizing thin beds with seismic data.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Seismic data are limited, through, in one crucial regard: rock units that are relatively "thin" are often not clearly resolved. In more particular, whereas seismic reflection data can provide a near "geologic cross section" representation of the subsurface when the lithologic layers are relatively thick, the seismic image that results when the layers are thin is much less clear. This phenomenon is known to those skilled in the art as the seismic resolution problem.

Seismic resolution in the present context will be taken to refer to vertical resolution within a single seismic trace, and is loosely defined to be to the minimum separation between two seismic reflectors in the subsurface that can be recognized as separate interfaces—rather than as a single composite reflection—on the seismic record. By way of explanation, a subsurface unit is ideally recognized on a seismic section as a combination of two things: a distinct reflection originating at the top of the unit and a second distinct reflection, possibly of opposite polarity, originating from its base. In the ideal case, both the top and the bottom of the unit appear on the recorded seismogram as distinct and isolated reflectors that can be individually "time picked" (i.e., marked and identified) on the seismic section, the seismic data within the interval between the two time picks containing information about the intervening rock unit. On the other hand, where the seismic unit is not sufficiently thick, the returning reflections from the top and the bottom of the unit overlap, thereby causing interference between the two reflection events and blurring the image of the subsurface. This blurred image of the subsurface is one example of the phenomena known to those skilled in the art as the "thin bed" problem.

On the surface, the composite reflection from one or more thin beds is typically acknowledged to be the arithmetic sum (superposition) of the multiple returning reflections, taking into account the time separation between the events. However, when multiple returning waveforms overlap in time, the recorded seismic record will yield a confusing picture of the actual subsurface layer configuration and such interference makes it difficult to determine the number and thickness of beds contained within the composite reflection event.

Needless to say, the thickness of a subsurface exploration target is of considerable economic importance to an oil company explorationist because, other things being equal, the thicker the lithographic unit the greater the volume of hydrocarbons it might potentially contain. Given the importance of accurately determining layer thickness, it should come as no surprise that a variety of approaches have been employed in an effort to ameliorate the thin bed problem including deconvolution (to whiten and shorten the length of the returning waveform), wavelet processing (e.g., signature deconvolution), etc. Although any of these processes could potentially yield in dramatic changes in the character of the recorded seismic section and may shorten the length of the wavelet significantly, there are many instances where other techniques are needed.

General information related to the thin bed problem and to seismic exploration and processing in may be found within U.S. Pat. No. 5,870,691 and U.S. Pat. No. 6,131,071, the disclosures of which are incorporated by reference herein as if fully set out at this point.

Heretofore, as is well known in the seismic processing and seismic interpretation arts, there has been a need for a method of identifying and interpreting thin bed reflections. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for using both a temporal zone of seismic data and conditioned amplitude spectra thereof to determine the underlying layer sequence. The instant invention is suitable both for determining layer positions and layer impedance magnitudes that best describe the geologic sequence sampled by a band limited seismic source wavelet as reflected from the zone. The instant invention is most useful in the context of imaging thin bed reflections.

By way of summary, the preferred steps in the instant invention include:

1. Windowing the data;
2. Tapering the data;
3. Transforming the data;
4. Spectrally balancing the data;
5. Inverting the spectrally balanced data for the layer thickness and order according to the equations discussed hereinafter;
6. Inverting the spectrally balanced data for the relative impedance magnitude of the layering;
7. Crosscorrelating the filtered reflection coefficient series with the input data to determine the time orientation (forward/reverse) and correct arithmetic sign (polarity) of the impedance magnitude;
8. Writing a layer solution to output; and,
9. Writing a filtered reflection coefficient solution to output for comparison with input data.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 1 illustrates a spectral response/spectral interference of a thin bed and the genesis of a tuned response from a thin geologic layer.

FIG. 2 illustrates some aspects of the convolutional model in a stationary case, wherein a seismic trace is shown in both the time and frequency domains as being the convolution of earth reflectivity with a band limited source wavelet in the presence of noise.

FIG. 5 contains a real data example of the effects of spatial spectral balancing on individual trace spectra.

FIG. 6 contains a schematic illustration of the common spectral response before and after spectral balancing which illustrates how spatial spectral balancing produces an output that is less dependent on the nature of the input seismic data.

FIG. 7 illustrates the general environment of the instant invention.

DETAILED DESCRIPTION

Figure 3:
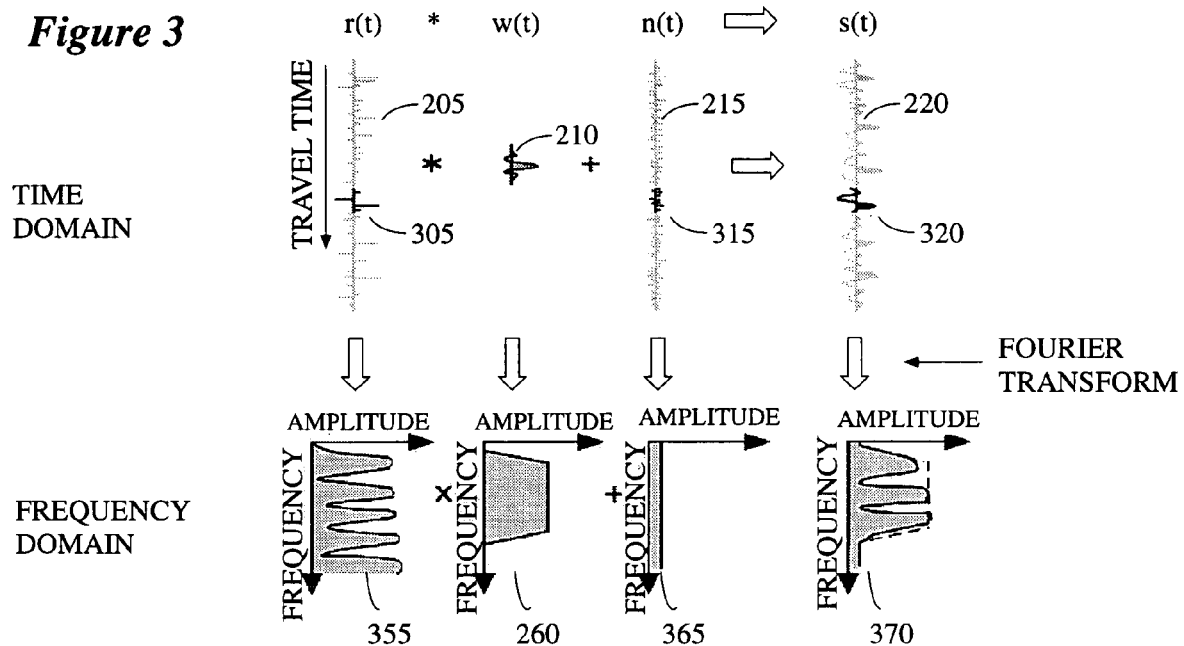
FIG. 3 contains a schematic illustration of how thin bed seismic events impact the amplitude spectrum of wavelet that is convolved therewith.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 7 illustrates the general environment in which the instant invention would typically be used. Seismic data 710 are collected in the field over a subsurface target of potential economic importance and are typically sent thereafter to a processing center. In the processing center a variety of preparatory processes 720 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 740 that has been loaded onto a general purpose programmable computer 750 where it is accessible by a seismic interpreter or processor. Note that a general purpose computer 750 would typically include, in addition to mainframes and workstations, computers that provide for parallel and massively parallel computations, wherein the computational load is distributed between two or more processors. As is also illustrated in FIG. 7, in the preferred arrangement some sort of digitized zone of interest model 760 is preferably specified by the user and provided as input to the processing computer program. In the case of a 3D seismic section, the zone of interest 760 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 740 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 8. After processing by the instant methods, the resulting traces would then typically be sorted into gathers, stacked, and displayed either at a high resolution color computer monitor 770 or in hard-copy form as a printed seismic section or a map 780. The seismic interpreter would then use the displayed images to assist him or her in identifying subsurface features conducive to the generation, migration, or accumulation of hydrocarbons.

Figure 8:
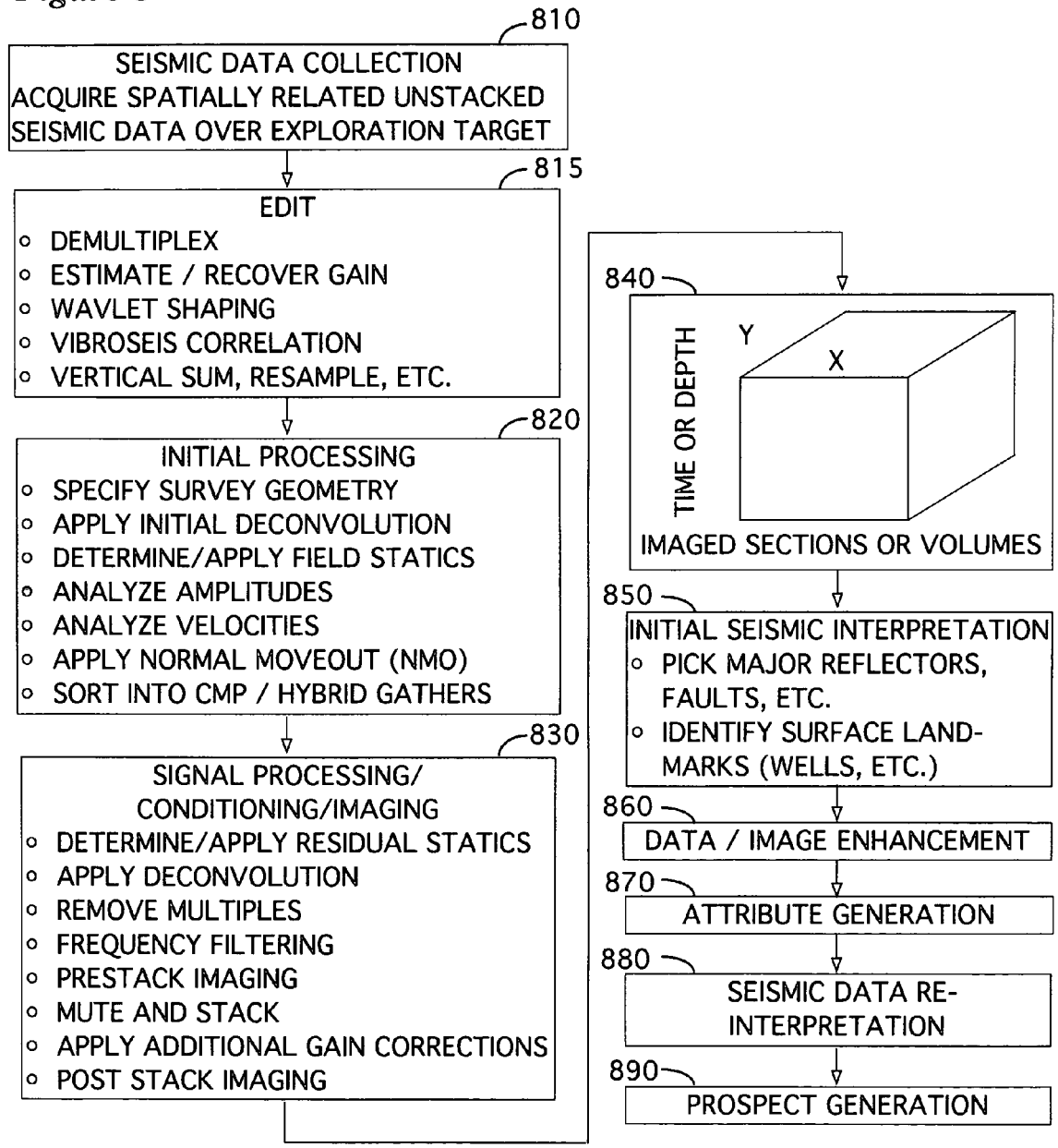
FIG. 8 illustrates a seismic processing sequence suitable for use with the instant invention.

As was indicated previously, the instant invention will preferably be made a part of and incorporated into a conventional seismic processing sequence of the sort generally indicated in FIG. 8. Those of ordinary skill in the art will recognize that the processing steps illustrated in FIG. 8 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 8, a 2D or 3D seismic survey is conducted over a particular volume of the earth's subsurface (step 810). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey. The invention disclosed herein is most effective when applied to a group of stacked seismic traces that have an underlying spatial relationship with respect to some subsurface geological feature. Again for purposes of illustration only, the discussion that follows will be couched in terms of traces contained within a stacked 3-D survey, although any assembled group of spatially related seismic traces could conceivably be used.

After the seismic data are acquired, they are typically taken to a processing center where some initial or preparatory processing steps are applied to them. As is illustrated in FIG. 8, a common early step 815 is designed to edit the input seismic data in preparation for subsequent processing (e.g., demux, gain recovery, wavelet shaping, bad trace removal, etc.). This might be followed by specification of the geometry of the survey (step 820) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

After the initial pre-stack processing is completed, it is customary to condition the seismic signal on the unstacked seismic traces before creating stacked (or summed) data volumes (step 830). In FIG. 8 step 830 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is suggested in FIG. 8, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 840). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 850 of the resulting stacked volume, wherein he or she locates and identifies the principal reflectors and faults wherever they occur in the data set. This might be followed by additional data enhancement 860 and/or attribute generation (step 860) of the stacked or unstacked seismic data. In many cases the explorationist will revisit his or her original interpretation in light of the additional information obtained from the data enhancement and attribute generation steps (step 880). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 890).

Preferred Data Preparation

Under standard geophysical models, there is a predictable relationship between geologic layering and the seismic response that is observed when down going energy from a surface source is reflected from a zone in the subsurface. Consider, for example, the simplest case of a single isotropic layer in a likewise isotropic background of harder material (subsurface model 100 of FIG. 1), with acoustic impedance profile 125 and reflection coefficients 130. It is well known that if a zero-phase band limited seismic pulse 105 with amplitude spectrum 135 is initiated at the surface, it will propagate through the hard material ultimately reaching the top of the soft layer where a reverse polarity reflection occurs (wavelet 110), the net effect being that a portion of the down going seismic energy is transmitted upward toward the surface. Then, after a time delay, determined by the thickness and sonic velocity of the softer unit, the source wave front will reach the bottom of the unit where a positive reflection will occur (wavelet 115). If the soft layer is very thick, or of very low velocity, the two reflected events (i.e., top and bottom) will be well separated in time and easily identifiable on the recorded seismic section. However, as the soft layer thins, or its internal velocity increases, the two reflections eventually get close enough together to interfere with each other (wavelet 120). The frequency effect of this thin bed interference is to introduce a regular notching in the amplitude spectrum 140 of the wavelet 120. The period of the notches in frequency is inversely proportional to the temporal thickness of the layer in question. While simplistic, this explanation demonstrates that it is at least theoretically possible that a given collection of layers will have a characteristic spectral signature.

Now consider a more complex case wherein a stationary seismic trace is constructed by populating the subsurface with many layers (subsurface model 205 of FIG. 2), so many layers in fact that the amplitude spectra 255 of the layer reflectivity series characterizes the overall lithologic model. The slope of the model spectrum 255, unaffected by source wavelet or noise, characterizes the spatially local geologic sequence being investigated. Pursuant to the tenets of the convolutional model, a seismic trace 220 may be constructed from this reflectivity series 205 by convolving the reflectivity series with the impulse response of a band limited source wavelet 210. In practice, some noise 215 is preferably added as well.

The frequency domain representation 255 of the reflectivity series 205 is a smooth curve that usually exhibits increasing amplitude with frequency. Of course, the character of the curve is a function of the exact geologic makeup of the series itself, with the spectral slope being related to the size and distribution of reflection coefficients within the reflectivity series. The frequency representation 260 of the band limited source wavelet will be taken for purposes of illustration to be a trapezoidal filter where amplitudes ramp up to the lower limit of the pass band, remain constant throughout, and ramp down after the uppermost frequency limit. As a convolution in time corresponds to a multiplication in frequency, the reflectivity spectrum 255 may be simply multiplied by the source wavelet spectrum 260 in order to convolve the source wavelet with the reflectivity series. The noise affect is usually taken to be additive so in frequency (spectrum 265) or in time and the noise component may typically be directly added. The resulting seismic trace then becomes then a band-limited version of the reflectivity response sitting on a noise pedestal.

Things become more interesting if a very short window of reflectivity (see FIG. 3) is considered. The amplitude spectrum 355 of the local reflectivity series 305 now shows significant character with many notches and peaks that are directly associated with local variations in layering. The spectrum 260 of the source wavelet 210 will still be taken to be a band limited trapezoidal signature as was discussed previously. The noise 315 will once again be taken to be "white" or uncorrelated/random with spectrum 365. Of course, this is unlikely in practice but this assumption makes it possible to assume a large signal to noise ratio. The short window seismic trace 320, when viewed in the frequency domain 370, is now essentially the band limited short window reflectivity response, where the notches and peaks in the spectrum are characteristic of the layering sampled, again sitting upon a pedestal of noise. The seismic trace is thus composed of colored layer interference, a source wavelet overprint and noise.

Figure 4:
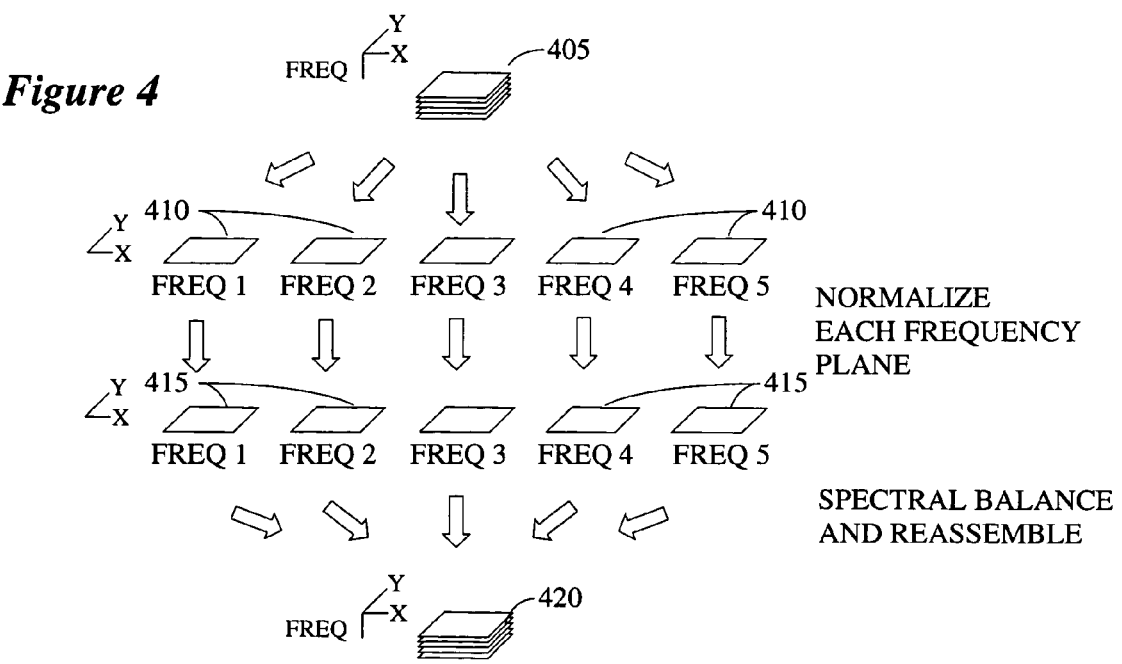
FIG. 4 illustrates a method of spectral balancing via spatial median filtering, such filtering being designed to remove the effect of the band limited source wavelet, spectral color, and absolute impedance from a short time window zone of interest, and, hence, from its amplitude spectra.

It has been recognized previously (e.g., U.S. Pat. Nos. 5,870,691 and 6,131,071, the disclosures of which are fully incorporated herein by reference) that the wavelet overprint and layering color could be factored out of the system by a spatial spectral balancing of the zone of interest. Although spectral balancing might be done in many ways, FIG. 4 illustrates one preferred approach. As the area under consideration becomes large the median spectral response becomes dominated by the effects of the common source and the common spectral color. By taking the Fourier transform of the input data (transformed data volume 405), separating the Fourier transformed data volume 405 into individual horizontal constant frequency slices 410, and scaling/normalizing each frequency component over an area, by setting the median spectral value for that frequency 415 to a target spectral amplitude common to all frequencies. The wavelet overprint, the spectral color, and absolute impedance contrast due to the characteristic layering are removed. The slices 415 are then recombined into a single volume 420. After such frequency domain scaling, the resulting spectrum is more representative of the zone of interest characterized by white layer interference and noise. This process renders of lesser importance the nature of the input seismic dataset. Be it reflectivity, impedance, or band limited reflectivity, the nature of the spectra reduces at least approximately to a common response after wavelet overprint removal (FIG. 6).

Since, after balancing the resulting short window spectral response is largely independent of source signature, spectral color, phase and any band-limiting filter that has been applied, an inversion can be developed that is aimed at recovering the white layer interference in order to position the major geologic boundaries within the zone. Once these boundaries are positioned, an inversion can also be constructed that will provide estimates of the magnitudes of the various layer impedances, with this process continuing until a best match is obtained to both the balanced spectral response and the input temporal seismic zone of interest. The text that follows illustrates one preferred method of such inversion.

Preferred Inversion

According to a preferred aspect of the instant invention, in order to perform an analytic inversion of the preferably balanced spectra, a mathematical expression that describes the spectral response from a collection of layers has been developed. Objective functions have been designed for use with a gradient search algorithm to solve for layer thickness, layer position and relative layer impedance magnitude.

The inversion method that is preferably utilized in the instant invention is developed as follows. The response at a frequency $f_i$ of a series of N reflectors is given by:

$$G(f_i) = \sum_{k=1}^{N} R_k e^{-j2\pi f_i t_k},$$

where:
$G(f_i)$=the observed seismic response at frequency $f_i$,
$f_i$=the current frequency,
$R_k$=the reflection coefficient of the kth reflector, and,
$t_k$=the two way travel time to the kth reflector.
Alternatively this response can be written as $$G(f_i) = \sum_{k=1}^{N} R_k \cos(2\pi f_i t_k) - j \sum_{k=1}^{N} R_k \sin(2\pi f_i t_k),$$

which has an amplitude at $f_i$ that is equal to $$A(f_i) = \left[ \left\{ \sum_{k=1}^{N} R_k \cos(2\pi f_i t_k) \right\}^2 + \left\{ \sum_{k=1}^{N} R_k \sin(2\pi f_i t_k) \right\}^2 \right]^{1/2}.$$

After expanding the squared terms and simplifying, the previous equation becomes:

$$A(f_i) = \left[ \sum_{k=1}^{N} R_k^2 + 2 \sum_{i=1}^{N-1} \sum_{l=i+1}^{N} R_i R_l \cos(2\pi f_i (t_i - t_l)) \right]^{1/2}.$$

In order to use a gradient search to match optimal times and reflection coefficients with respect to a measured amplitude spectrum, analytical equations describing the partial derivatives with respect to these variables are useful. The partial derivative of the amplitude response at $f_i$ with respect to the reflection at time $t_l$ is $$\frac{\partial A(f_i)}{\partial t_l} = \frac{1}{2A(f_i)}$$

$$\left[ 2\left\{ \sum_{k=1}^{N} R_k \cos(2\pi f_i t_k) \right\}\{-2\pi f_i R_l \sin(2\pi f_i t_l)\} + \right.$$

$$\left. 2\left\{ \sum_{k=1}^{N} R_k \sin(2\pi f_i t_k) \right\}\{2\pi f_i R_l \cos(2\pi f_i t_l)\} \right]$$

That is, $$\frac{\partial A(f_i)}{\partial t_l} = \frac{2\pi f_i R_l}{A(f_i)} \left[ \left\{ \sum_{k=1}^{N} R_k \cos(2\pi f_i t_k) \right\}\{-\sin(2\pi f_i t_l)\} + \right.$$

$$\left. \left\{ \sum_{k=1}^{N} R_k \sin(2\pi f_i t_k) \right\}\{\cos(2\pi f_i t_l)\} \right]$$

which simplifies to:

$$\frac{\partial A(f_i)}{\partial t_l} = \frac{2\pi f_i R_l}{A(f_i)} \left[ \sum_{k=1}^{N} R_k \sin(2\pi f_i (t_k - t_l)) \right].$$

The partial derivative of the amplitude response at $f_i$ with respect to the reflection at coefficient $R_l$ is then given by:

$$\frac{\partial A(f_i)}{\partial R_l} = \frac{1}{A(f_i)} \left[ \sum_{k=1}^{N} R_k \cos(2\pi f_i (t_k - t_l)) \right].$$

Optimization

The layer stacking inversion procedure preferably comprises the determination of the reflection times that minimizes the objective function described by the sum of squares error between the observed frequency and modeled spectra. That is, $$O(t, N) = \frac{1}{m} \sum_{i=1}^{m} \left( \frac{S_i A_N(f_i) - \overline{A_i}}{\sigma_i} \right)^2$$

where:—
N=the number of reflections,
m=the number of frequencies used in the comparison,
$A_N(f_i)$=the amplitude spectrum of the current N reflections model,
$\overline{A_i}$=the measured amplitude spectrum at frequency I,
$S_i$=a multiplier to balance the dynamic ranges of the spectra, and,
$\sigma_i$=the error in the ith frequency slice i.

In the preferred embodiment, the parameter $\sigma_i$ will be the statistical variance (or other measure of variability) of the uncertainty of the "ith" constant frequency plane in the tuning cube. However, in another preferred embodiment σ a constant value for each seismic trace and is equal to the statistical variance of the observed amplitude spectrum $\overline{A_i}$.

The minimum of the objective function will preferably be determined by gradient search since the partial derivatives with respect to t are given by:

$$\frac{\partial O(t, N)}{\partial t_l} = \frac{2}{m} \sum_{k=1}^{m} \frac{S_i A(f_i) - \overline{A_i}}{\sigma_i} \frac{S_i}{\sigma_i} \frac{\partial A(f_i)}{\partial t_l}$$

Substituting the partial derivatives of the frequency response with respect to the reflection times yields:

$$\frac{\partial O(t, N)}{\partial t_l} = \frac{2 R_l}{m} \sum_{i=1}^{m} \left[ \frac{(S_i A(f_i) - \overline{A_i}) S_i}{\sigma_i^2} \frac{2\pi f_i}{A(f_i)} \sum_{k=1}^{N} R_k \sin(2\pi f_i (t_k - t_l)) \right].$$

Similarly the partial derivatives of the objective function with respect to the reflection coefficients are described by the equation:

$$\frac{\partial O(t, n)}{\partial R_l} = \frac{2}{m} \sum_{i=1}^{m} \left[ \frac{(S_i A(f_i) - \overline{A_i}) S_i}{\sigma_i^2} \frac{1}{A(f_i)} \sum_{k=1}^{N} R_k \cos(2\pi f_i (t_k - t_l)) \right].$$

Note that the parameter "N" will generally be unknown in advance, as it represents the true number of reflectors in the selected time interval. However, in one preferred embodiment the user will be allowed to select an initial value for this parameter which might be limited between, say, one and 19 reflectors. This would result in an average layer thickness of about 5 ms for a 100 ms time window. As is indicated by the previous equations, a measured trace spectrum is then matched against the spectrum for this model, the reflections times and amplitudes are adjusted as described above, until a minimum value for the objective function is obtained. When the minimum objective value is obtained for the current number of reflections, if any layer time thickness is less than a user specified minimum (e.g., about 1 ms) then that layer is preferably removed. If all of the remaining layer thicknesses are greater than the threshold, then preferably either the last layer or the layer with the greatest "most squares" uncertainty is removed from the set and the spectrum of the new set recalculated. The spectrum of the new set of reflectors is then matched against the measured spectrum. This process (i.e., delete one reflector and recalculate the spectrum of the model) is preferably repeated until only one layer remains. The number of layers with the minimum objective function value is then preferably selected as the reflectivity solution for the current trace and its associated fitted reflection times are output for use by the explorationist.

Note that the embodiment described above solves for the reflectivity series in each trace separately. Those of ordinary skill in the art will certainly recognize that it would be possible to solve for all (or any subset of) such reflectivity series simultaneously by appropriate modification of the objective function introduced previously to include reflectivities and times from more than one trace.

Additionally, and as another preferred embodiment, there might be occasions where the reflectivity series will be solved independently for each trace but with the separate solutions being constrained so that they do not vary too much from trace to trace, e.g., a "smoothness" parameter might be imposed on the solution. However, the instant inventors have determined that in practice such steps will generally not be necessary, as the independently calculated individual trace solutions tend to agree with one another other to a very large degree, thereby tending to validate the approach.

It is not enough to know the temporal thickness, order and relative magnitude of the layers however. One must also know the sign and temporal orientation of the system on the time axis. Such information is not contained in the amplitude spectra upon which the inversion was performed. To make this determination it is preferable to first calculate, based on the inverted layering solution, reflection coefficients at each interface according to the method discussed previously. The resulting reflection coefficient series is then preferably filtered to the same frequency bandwidth, and sample interval as the input temporal seismic data. Of course, the reflection coefficient series could also be convolved with an actual or idealized source wavelet instead. In any case, the resulting unphased model seismic dataset next preferably undergoes a four way crosscorrelation against the input original (time domain) seismic data to determine the correct impedance polarity (i.e., should the impedance values be left as they are or reversed in sign), and orientation, (i.e., should the layer system be left as it is or reversed in time). The solution whose correlation has the largest correlation coefficient is taken as the best fit to the observed data, with the lag at which the greatest collection occurs being a measure of the time shift that should be applied to the reflectivity solution.

FIG. 5 indicates a preferred data preparation sequence for use with the instant invention. As a first preferred step, a zone-of-interest time domain slab 505 will be extracted from the 3-D survey, with the vertical and lateral dimensions of the slab 505 being determined by the interpreter to track a subsurface target of interest. Seismic section 530 illustrates how a small portion of a typical zone of interest might appear. Next, the data 505 will preferably be processed via a Fourier transform and spectra for each trace computed, with the results being organized into a tuning cube which is susceptible to viewing as collection of vertical time slices (510 and data example 535) or as a collection of horizontal constant-frequency planes 515. Next, each constant frequency plane 515 will preferably be separately scaled as has been discussed previously to produce a spectrally balanced tuning cube 520 which may be viewed as a collection of horizontal slices or as vertical sections 525. Spectrally balanced tuning cube cross sectional view 540 provides an example of how a vertical section of a spectrally balanced tuning cube would appear.

Figure 9:
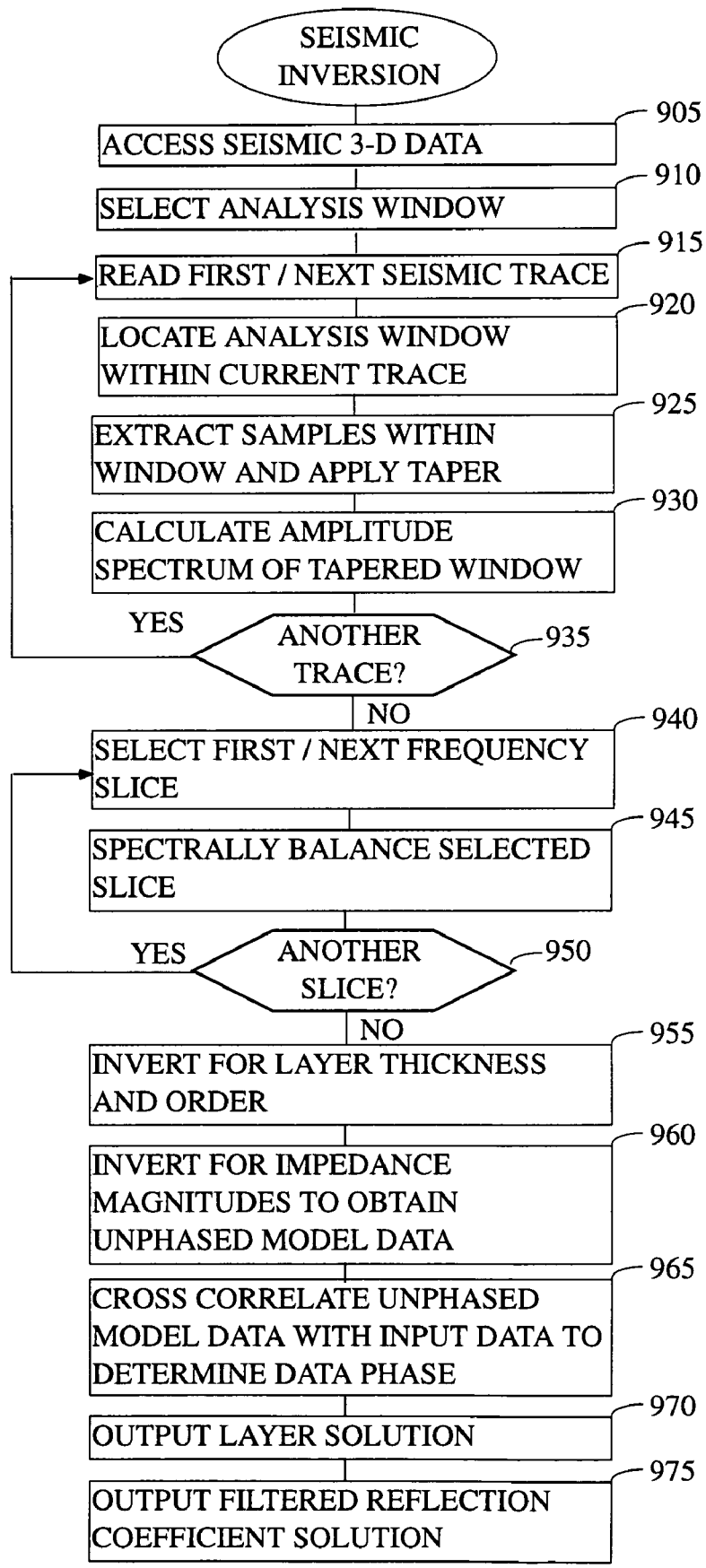
FIG. 9 contains a flowchart of some preferred steps in the instant invention.

Now, turning in more detail to the overall process preferred by the instant inventors, as is generally set out in FIG. 9 the flow of processing steps that would typically be utilized to perform an analytic spectral inversion of a temporal seismic zone of interest would generally consist of:

1. Windowing the data.

As a first preferred step 905, a seismic data set will be accessed. The seismic data might be stored on magnetic tape, magnetic disk, optical disk, etc., that is either directly accessible by the CPU that is executing the steps of the instant method or such storage might be accessed remotely via a network.

As a next preferred step 910 an analysis window will be selected. Although this step might be performed in many different ways, the preferred way is to load the data that is to be analyzed (usually a 3D seismic data set) onto a workstation or other computer with a high-resolution display device attached thereto. Then, a guide horizon will be identified (e.g., picked) either manually, automatically, or using some combination of these two approaches. Methods for doing this are well known to those of ordinary skill in the art. The seismic data may or may not be flattened to the guide horizon, although that is often done for quality control or other reasons.

Based on the guide horizon picks, a time-window will preferably be formed in the seismic data. This analysis window might be defined in many ways. For example, the window might be defined to be a fixed number of milliseconds above, below, or either side of the guide horizon 505. In other instances, it might be a variable window that is based on some attribute(s) near the guide horizon (e.g., the time interval between the first peak above the guide horizon and the first peak below).

In any case, preferably the analysis window will be a relatively short window that encompasses only a few impedance contrast changes. The window should be long enough to see tuning effects in the amplitude spectrum, but short enough that it does not encompass too much geology. Further, if the window is very short, the step of computing the Fourier transform (discussed below) will yield too few frequencies for purposes of the inversion that follows. As a consequence, it is anticipated some amount of experimentation will be necessary to determine the optimal window. That being said, in some preferred embodiments a window length of 80 to 100 ms is suitable.

2. Tapering the data.

Next, a loop is preferably entered that reads that reads each seismic trace in the dataset in turn (steps 915 through 935). After each trace is read or otherwise made available to the instant method (step 915), the analysis window will preferably be located within the trace just read (step 920). Note that since it is anticipated that analysis windows that track seismic reflectors might be used, it may be necessary to calculate the location of the analysis window within each trace. Of course, constant-time analysis windows are certainly possible, as are windows that are flat because the traces that are used as input have been flattened with respect to the reflector of interest.

Next, the samples within the current trace analysis window will preferably be extracted for subsequent processing (step 925), although those of ordinary skill in the art will recognize that this is done as a convenience and not as a necessity. As a next preferred step, the time domain windowed data will be tapered. As is well known to those of ordinary skill in the art, tapering is often used to reduce the edge effects that would otherwise be apparent in spectra that are computed. There are any number of taper functions (e.g., as Gaussian or cosine tapers) that could be utilized.

3. Transforming the data.

Preferably, the now-tapered data will be transformed via a Fourier transform and an amplitude spectrum will be computed for each trace (step 930). Methods for doing this are, of course, very well known to those of ordinary skill in the art. Additionally, it should be noted that the Fourier transform is just one of a number of discrete orthonormal transforms that could be used and, as such, the use of a Fourier amplitude transform should only be regarded as an example of the sort of transform that might be applied. What is important is that some frequency-related quantity be extracted from the windowed seismic data, whether that comes in the form of the traditional Fourier transform or some other transform (e.g., Walsh transform, sine transform, cosine, transform, etc.).

Preferably, steps 915-935 will be repeated until all of the traces in the input dataset have been read and processed.

4. Spectrally balancing the data.

Note that at the conclusion of the previous step, the data consist of a collection of Fourier transform spectra, one spectrum per window/seismic trace. In effect, since each spectrum is associated with a specific location on the surface of the earth, the collection of spectra forms a seismic volume over the subsurface target of interest.

Although the spectral balancing process (steps 940, 945, and 950) is not strictly required, it is preferred for many reasons. One reason for doing this is that spectral balancing according to the method discussed hereinafter tends to attenuate or remove the wavelet overprint and spectral color from the seismic data, at least so long as the wavelet is laterally stable.

Turning now to FIG. 4, wherein the spectral balancing step is illustrated schematically, the cube of amplitude spectral values 405 (actually more a rectangular volume than a cube in this example) is preferably separated into a plurality of constant frequency slices 410. Note that each horizontal slice into the volume of transformed data values corresponds to an amplitude at the same Fourier frequency from each trace.

As a next preferred step, the median value of the amplitudes contained within each horizontal slice will be separately calculated, thereby producing one median amplitude for each slice/frequency. For each frequency, a scalar is determined that will scale that median to a target value. For each frequency, all spectral amplitudes are multiplied by the appropriate scalar as determined above, thereby producing a collection of slices 520 (also 415 of FIG. 4) that are all scaled to have the same median value. In FIG. 6, the spatial median spectral amplitudes are represented by generalized curves 605-615, and the constant values 620, 625, and 630 represent the median spectral amplitudes after application of the spectral balancing scalars as calculated above.

It should be noted and remembered that the above-preferred algorithm is just one of many that could be used to spectrally balance the amplitude spectra data. Those of ordinary skill in the art will be readily able to devise other methods of performing such balancing.

5. Inverting the spectrally balanced data for the layer thickness and order according to equations discussed previously.

In the preferred embodiment, as a next step each trace in the frequency balanced spectral amplitude cube will be inverted according to the equations introduced previously (step 955). That is, the previous equations set out a relationship between reflectivity ($R_k$), the two-way travel time ($t_k$) and the observed trace amplitude spectra. The preferred numerical solution (discussed previously) utilizes a gradient method to minimize an objective function (O(t,N)) in terms of the unknown reflection coefficients and travel times. The minimizing solution, of course, provides the preferred subsurface parameter estimates.

Of course, those of ordinary skill in the art will recognize that there are many other methods of obtaining estimates of the travel times and reflectivities from the equations presented previously and that the method suggested herein is only a preferred approach.

6. Inverting the spectrally balanced data for the relative impedance magnitude of the layering.

As a next preferred step, the reflectivities will be inverted to produce corresponding impedance magnitudes according to methods well known to those of ordinary skill in the art (step 960). Of course, and as is discussed at greater length below, the resulting impedance series is unphased in the sense that the polarity and time orientation of the data will typically be indeterminate at this point.

7. Crosscorrelating the filtered reflection coefficient series with the input data to determine the time direction and correct arithmetic sign (polarity) of the impedance magnitude (step 965).

Next, each of the reflection coefficient series obtained in the previous step will preferably be band-pass filtered to produce an approximation to the original windowed seismic data. As is well known to those of ordinary skill in the art, such filtering produces, in effect, a synthetic seismic trace that will hopefully be a good approximation to the data from which it was calculated. To the extent that the synthetic data resembles the input data, the numerical solution above has done a good job in determining the time location and magnitude of lithologic units that are below the normal resolution of seismic data.

Note that because the numerical solution suggested previously utilizes the amplitude spectra of the windowed data, the resulting solution will be invariant to the polarity of the input data and its time direction. Said another way, the amplitude spectrum of a time series and its negative are the same. Similarly, the amplitude spectrum of a time series and its time-reverse are also equal. As a consequence, the unphased reflectivity series that is calculated for each trace will be numerically accurate, but could be of the wrong polarity or oriented in the wrong time sense.

Thus, in the preferred embodiment the next step will be to create, and then cross correlate on a trace-by-trace basis four different candidate versions of the filtered reflectivity series with the input data: a positive time/positive polarity version, a reverse time/positive polarity version, a positive time/negative polarity version, and a reverse time/negative polarity version (step 965). Of the four cross correlations, the one containing the largest correlation coefficient will define the preferred lag, the polarity, and the time orientation of the output layering solution.

8. Writing a layer solution to output.

As a next preferred step, the layer solution—with proper time orientation. polarity, and time shift—will be written to nonvolatile storage (step 970). The information so written will typically be used by an explorationist to construct a lithologic model of the subsurface within the selected window. Additionally, and preferably, the layer solution would be very useful as input into, for example, a reservoir modeling program. Such programs would readily be able to utilize detailed thickness information as input in calculating reservoir reserves, projected/advised production rates, ultimate recovery volumes, etc.

9. Writing to output a filtered reflection coefficient solution for comparison with input data.

As a final preferred step, a filtered reflection coefficient solution will be written to disk (step 975). As has been explained previously, a filtered reflection coefficient series produces a synthetic seismogram that resents the seismic response that would be expected if (a) the velocities, densities, and layer configurations in the subsurface are exactly the same as those of the computer model; and (b) if the frequency content of the filter matches that of the seismic source. By comparing the synthetic with the input data the explorationist can evaluate the quality of the solution and, thus, give more credence to the result obtained via the method discussed previously to the extent that the synthetic data matches the data that were actually collected.

CONCLUSIONS

Those of ordinary skill in the art will recognize that although the objective function that is solved for the reflection coefficient series utilizing an expansion in terms of sines and cosines, that is not an absolute requirement. Indeed, there are any number of orthonormal basis functions that could be used instead. All that is required is that the observed trace frequency or amplitude spectrum be expressible in terms of the unknown reflectivity (or, equivalently, impedance) series. In other variations, instead of a Fourier-based frequency analysis, some other orthomomal function might be used (e.g., Walsh transforms, wavelet transforms, etc.). Those of ordinary skill in the art will readily be able to solve the resulting equations for an estimate of the reflectivity series. Thus, when the terms "frequency spectrum" or "amplitude spectrum" are used herein, that term should be broadly construed to include any collection of coefficients from a discrete orthonormal transform that can be used to at least approximately reconstruct the seismic data from which the "spectrum" was calculated.

Although the invention disclosed herein was discussed almost exclusively in terms of seismic traces organized into "CMP" gathers, that was done for purposes of specificity only and not out of any intent to limit the instant invention to operation on only that sort of seismic data. So, within the text of this disclosure, the terms seismic trace and CMP gather are used in the broadest possible sense of those terms, and they are meant to apply to conventional 2D and 3D traces and CMP gathers, as well as to other sorts of gathers which might include, without limitation, CRP gathers, CCP gathers (i.e., "common conversion point" gathers), CACP ("common asymptotic conversion point") gathers, common offset gathers, common shot/receiver gathers, etc, the most important aspect of a "gather" being that it represents an organized collection of unstacked seismic traces from either a 2D or 3D survey all of which have at least one subsurface image point in common.

As a specific example of an alternative discrete orthonormal transform, those of ordinary skill in the art understand that a discrete Walsh transform could be used in place of the Fourier transform and the Walsh coefficients could be similarly grouped, displayed, and analyzed. In a manner similar to that disclosed above, a Walsh transform may be computed of the model reflectivity series and thereafter compared with the transform of the windowed data. Rather than the calculated transform coefficients representing frequency, of course, these coefficients would instead represent a similar quantity called "sequency" by those of ordinary skill in the art. Thus, "tuning cubes may be formed from the Walsh transform coefficients—with each horizontal slice corresponding to the same sequency—in a manner analogous to that described previously in connection with the Fourier transform.

Finally, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wife variety of types of geophysical time series, but it is preferably applied to a collection of spatially related time series containing thin bed reflection events or AVO (i.e., amplitude versus offset) effects therein.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of processing seismic data for use in geophysical exploration within a predetermined volume of the earth containing structural and stratigraphic features conducive to the generation, migration, accumulation, or presence of hydrocarbons, comprising the steps of:
    (a) collecting a seismic survey that images at least a portion of said predetermined volume of the earth;
    (b) within said seismic survey, selecting a plurality of seismic traces;
    (c) identifying a time window within each of said plurality of seismic traces, each of said time windows containing seismic data therein;
    (d) for each of said identified time windows, transforming said data within said time window via a Fourier transform, thereby producing a Fourier transform dataset for each of said windows so transformed;
    (e) calculating an amplitude spectrum for each of said identified time windows from said Fourier transform datasets;
    (f) selecting one of said amplitude spectra,
    (g) selecting an initial reflectivity model,
    (h) calculating an amplitude spectrum of said initial reflectivity model,
    (i) selecting an objective function, said objective function at least relating said selected amplitude spectra and said spectrum of said initial reflectivity model,
    (j) calculating a reflectivity series by optimizing said objective function with respect to said reflectivity series; and,
    (k) writing at least a portion of said calculated reflectivity series to computer storage.

2. A method of processing seismic data for use in geophysical exploration within a predetermined volume of the earth containing structural and stratigraphic features conducive to the generation, migration, accumulation, or presence of hydrocarbons, comprising the steps of:
    (a) collecting a seismic survey that images at least a portion of said predetermined volume of the earth;
    (b) within said seismic survey, selecting a plurality of seismic traces;
    (c) identifying a time window within each of said plurality of seismic traces, each of said time windows containing seismic data therein;
    (d) for each of said identified time windows, transforming said data within said time window via a Fourier transform, thereby producing a Fourier transform dataset for each of said windows so transformed;
    (e) calculating an amplitude spectrum for each of said identified time windows from said Fourier transform datasets;
    (f) calculating a reflectivity series from each of said amplitude spectra, thereby obtaining a representation of at least a portion of said structural and stratigraphic features; and,
    (g) for each of said amplitude spectra,
        (i) selecting an amplitude spectrum,
        (ii) calculating an unphased reflectivity series from said selected amplitude spectrum,
        (iii) filtering said unphased reflectivity series to a predetermined frequency range, thereby producing an unphased model seismic trace,
        (iv) forming at least four candidate traces from said selected unphased model seismic trace, wherein
            one of said at least four candidate traces has a positive polarity and a positive time orientation with respect to said selected unphased model seismic trace,
            one of said at least four candidate traces has a negative polarity and a positive time orientation with respect to said selected unphased model seismic trace,
            one of said at least four candidate traces has a positive polarity and a negative time orientation with respect to said selected unphased model seismic trace, and,
            one of said at least four candidate traces has a negative polarity and a negative time orientation with respect to said selected unphased model seismic trace,
        (v) cross correlating each of said candidate traces with said seismic data used to calculate said selected unphased model seismic trace, thereby producing four cross correlated traces,
        (vi) using said four cross correlated traces to determine at least a phase, a time orientation, and a lag, and,
        (vii) using said phase, said time orientation, and said lag to modify at least one of said unphased model seismic trace and said reflectivity series to better match said seismic data used to calculate said unphased model seismic trace, thereby obtaining a representation of at least a portion of said structural and stratigraphic features; and,
    (h) writing at least a portion of said calculated reflectivity series to computer storage.

* * * * *